(12) United States Patent
Artin (10) Patent No.: US 11,866,189 B2
(45) Date of Patent: Jan. 9, 2024

(54) LATCHING SYSTEM WITH MOVABLE ANTI-SHEAR MECHANISM

(71) Applicant: HARTWELL CORPORATION, Placentia, CA (US)

(72) Inventor: Bo D. Artin, Placentia, CA (US)

(73) Assignee: Hartwell Corporation, Placentia, CA (US)

( * ) Notice: Subject to any disclaimer, the term of this patent is extended or adjusted under 35 U.S.C. 154(b) by 86 days.

(21) Appl. No.: 17/213,023

(22) Filed: Mar. 25, 2021

(65) Prior Publication Data
US 2021/0300579 A1    Sep. 30, 2021

Related U.S. Application Data

(60) Provisional application No. 63/000,249, filed on Mar. 26, 2020.

(51) Int. Cl.
*B64D 29/06* (2006.01)
*E05B 63/00* (2006.01)
*E05C 19/14* (2006.01)

(52) U.S. Cl.
CPC .......... *B64D 29/06* (2013.01); *E05B 63/0017* (2013.01); *E05C 19/145* (2013.01); *E05B 2063/0026* (2013.01)

(58) Field of Classification Search
CPC ............. Y10T 292/0913; Y10T 292/68; Y10T 292/685; Y10T 292/688; Y10T 292/691; Y10T 292/696; Y10T 292/705; Y10T 292/216; B64D 29/06; E05B 63/0017; E05B 2063/0026; E05B 63/0052; E05B 63/0056; E05B 63/128; E05B 63/24; E05B 63/244; E05B 15/02; E05B 15/0205; E05B 15/022; E05B 15/024; E05B 15/0245; E05B 15/025; E05B 2015/023; E05B 2015/0235; E05B 2015/0275; E05B 17/2084; E05B 17/2088; E05B 17/2092; E05B 15/0295; E05B 63/12; E05C 19/145; E05C 19/10; E05C 19/12; E05C 19/14; Y10S 292/31; Y10S 292/40; Y10S 292/41; Y10S 292/49; Y10S 292/55
See application file for complete search history.

(56) References Cited

U.S. PATENT DOCUMENTS 1,473,076 A * 11/1923 Bonilla ............... E05B 17/2088
                                                                70/106
2,695,803 A * 11/1954 Mills ..................... E05C 19/145
                                                                292/DIG. 31
(Continued)

FOREIGN PATENT DOCUMENTS

CN        202926055 U  *  5/2013  ......... E05B 15/0086
CN        104797496 A  *  7/2015  ............. B64D 29/06
(Continued)

*Primary Examiner* — Kristina R Fulton
*Assistant Examiner* — Steven A Tullia
(74) *Attorney, Agent, or Firm* — Barnes & Thornburg LLP (57) ABSTRACT

A latching system for releasably securing a first structure relative to a second structure. The latching system includes a latch assembly coupled to the first structure and a keeper assembly coupled to the second structure. The latch assembly is selectively engageable with the keeper assembly to hold the first structure against movement relative to the second structure.

15 Claims, 10 Drawing Sheets

(56) References Cited

U.S. PATENT DOCUMENTS

| | | | |
|---|---|---|---|
| 2,714,032 A * | 7/1955 | Mills | B60J 9/02 292/113 |
| 2,874,986 A | 2/1959 | Henrichs | |
| 2,904,141 A * | 9/1959 | Henrichs | B64D 29/06 292/108 |
| 2,927,812 A | 3/1960 | Smith et al. | |
| 3,628,817 A | 12/1971 | Sheahan et al. | |
| 4,099,751 A | 7/1978 | Poe et al. | |
| 4,127,305 A * | 11/1978 | Nielsen | B60B 11/06 403/14 |
| 4,130,307 A | 12/1978 | Poe et al. | |
| 4,365,775 A * | 12/1982 | Glancy | B64D 29/06 244/129.4 |
| 4,478,446 A * | 10/1984 | Duran | E05B 15/025 292/113 |
| 4,691,952 A * | 9/1987 | Harmon | E05B 15/025 292/241 |
| 4,826,221 A | 5/1989 | Harmon | |
| 4,828,299 A | 5/1989 | Poe | |
| 4,911,485 A | 3/1990 | Wasilewski | |
| 5,620,212 A | 4/1997 | Bourne et al. | |
| 6,042,160 A * | 3/2000 | Hamada | E05B 85/045 292/216 |
| 6,334,588 B1 * | 1/2002 | Porte | B64D 29/08 244/129.4 |
| 6,343,815 B1 | 2/2002 | Poe | |
| 6,824,175 B2 * | 11/2004 | Porte | E05B 41/00 244/129.4 |
| 7,185,926 B2 | 3/2007 | Helsely et al. | |
| 7,252,311 B2 | 8/2007 | Pratt et al. | |
| 8,113,551 B2 * | 2/2012 | Baic | E05B 15/0006 292/DIG. 31 |
| 8,550,508 B2 * | 10/2013 | Gentile | E05B 17/0037 292/341.15 |
| 8,573,934 B2 * | 11/2013 | Soulier | E05C 19/145 415/214.1 |
| 8,752,871 B2 * | 6/2014 | Rechberg | E05B 15/0205 292/341.18 |
| 8,899,255 B2 * | 12/2014 | Mouton | B64D 29/06 244/129.4 |
| 9,273,488 B1 * | 3/2016 | Yu | B64D 29/06 |
| 9,975,642 B2 * | 5/2018 | Sitson | B64D 29/06 |
| 10,780,987 B2 * | 9/2020 | Ratajac | B64D 29/08 |
| 2006/0214431 A1 | 9/2006 | Helsley et al. | |
| 2008/0267694 A1 * | 10/2008 | Hein | E05C 19/145 403/92 |
| 2009/0051170 A1 * | 2/2009 | Baic | E05C 19/145 292/113 |
| 2011/0293414 A1 * | 12/2011 | Soulier | E05C 19/145 415/214.1 |
| 2013/0140832 A1 | 6/2013 | Do | |
| 2015/0184544 A1 * | 7/2015 | Fabre | B64D 29/06 244/54 |
| 2016/0280384 A1 * | 9/2016 | Aten | E05B 1/00 |
| 2016/0298367 A1 | 10/2016 | Dintheer | |
| 2016/0347465 A1 | 12/2016 | Mellor | |
| 2017/0058568 A1 * | 3/2017 | Do | E05C 19/10 |
| 2017/0058583 A1 | 3/2017 | Kim et al. | |
| 2017/0089107 A1 * | 3/2017 | Do | E05C 19/145 |
| 2017/0101811 A1 | 4/2017 | Parsell, Jr. et al. | |
| 2017/0283081 A1 * | 10/2017 | Kestler | B64D 27/14 |
| 2017/0298650 A1 | 10/2017 | Minter et al. | |
| 2018/0072429 A1 * | 3/2018 | Pierce | E05C 19/14 |
| 2019/0300189 A1 * | 10/2019 | Ratajac | E05B 9/00 |
| 2020/0190876 A1 * | 6/2020 | Lipson | E05C 3/008 |
| 2020/0318394 A1 * | 10/2020 | Moen | E05B 47/0047 |
| 2021/0300579 A1 * | 9/2021 | Artin | E05B 15/022 |
| 2021/0347494 A1 | 11/2021 | Aguilar et al. | |
| 2022/0194612 A1 * | 6/2022 | McMahan | B64D 29/06 |

FOREIGN PATENT DOCUMENTS

| | | | |
|---|---|---|---|
| EP | 0487912 A1 * | 10/1991 | B64D 29/06 |
| EP | 1607558 A1 * | 12/2005 | E05B 47/0046 |
| EP | 2444575 A1 * | 4/2012 | E05C 19/145 |
| EP | 3208188 A2 * | 8/2017 | B64C 7/02 |
| EP | 3556974 A1 * | 10/2019 | E05B 13/002 |
| EP | 3800126 B1 * | 1/2023 | B64D 29/06 |
| FR | 2641952 A1 * | 1/1989 | E05C 19/145 |
| GB | 2222432 | 3/1990 | |
| WO | WO-2020000040 A1 * | 1/2020 | E05B 47/0047 |

* cited by examiner

LATCHING SYSTEM WITH MOVABLE ANTI-SHEAR MECHANISM

CROSS REFERENCE TO RELATED APPLICATIONS

This application claims the benefit of priority under 35 U.S.C. § 119(e) to U.S. Provisional Patent Application No. 63/000,249, filed Mar. 26, 2020. The disclosure set forth in the referenced application is incorporated herein by reference in its entirety.

FIELD OF THE DISCLOSURE

The present disclosure relates generally to a latch system, and specifically to a latch system having a latch assembly and corresponding keeper assembly. More specifically, the present disclosure relates to a latching system having a latch assembly and corresponding keeper assembly for releasably securing a first structure relative to a second structure on an aircraft.

BACKGROUND

A variety of latching systems are used on aircraft to retain various components of the aircraft in a locked condition under circumstances such as flight and storage of the aircraft. During maintenance or repair periods the latches must operate to unlock the corresponding panel, cowling, or other device. For example, the latch on a radome can be disengaged to allow the radome to be opened away from the underlying components which it houses. The opening allows the aircraft maintenance professional to access the components. At the end of the repair event the radome is closed. The latch is used to lock the radome in the closed condition around the components in the housing.

Latching systems may provide a tension load to hold the corresponding panel closed. Panels can experience forces that place a shear load across the latching system, such as with differential pressures on inner and outer surfaces of the panel and aerodynamic loads during flight. It would be desirable to have a latching system equipped to handle shear loads in addition to providing the tension loads for holding a panel or other structure in place.

This background information is merely for context and no admission is intended, nor should such admission be inferred or construed, that any of the preceding information constitutes prior art against the present disclosure.

BRIEF DESCRIPTION OF THE DRAWINGS

The present disclosure will be described hereafter with reference to the attached drawings which are given as a non-limiting example only, in which.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying modes of carrying out the disclosure as presently perceived.

DETAILED DESCRIPTION

An illustrative latching system 10 in accordance with the present disclosure is shown in FIGS. 1-4. The latching system 10 includes a latch assembly 12 and a keeper assembly 16 configured for selective engagement with the latch assembly 12 to hold a first structure, such as a panel on an aircraft, against movement relative to a second structure, such as to cover an opening in an airframe of the aircraft. In the illustrative embodiment, the latch assembly includes a latch mechanism 14 mounted on a frame 13 for movement between an opened position (FIGS. 11 and 12) and a closed position (FIGS. 13 and 14) as shown in FIGS. 1-4 and 10-14. The keeper assembly 16 includes a base 17, a movable anti-shear mechanism 18 coupled to the base 17, and a keeper 19 coupled to the anti-shear mechanism 18 as shown in FIGS. 1-9 and 11-15. Engagement of the latch mechanism 14 with the keeper 19 moves the anti-shear mechanism 18 relative to the base 17 as shown in FIGS. 1-4 and 11-13.

Figure 1:
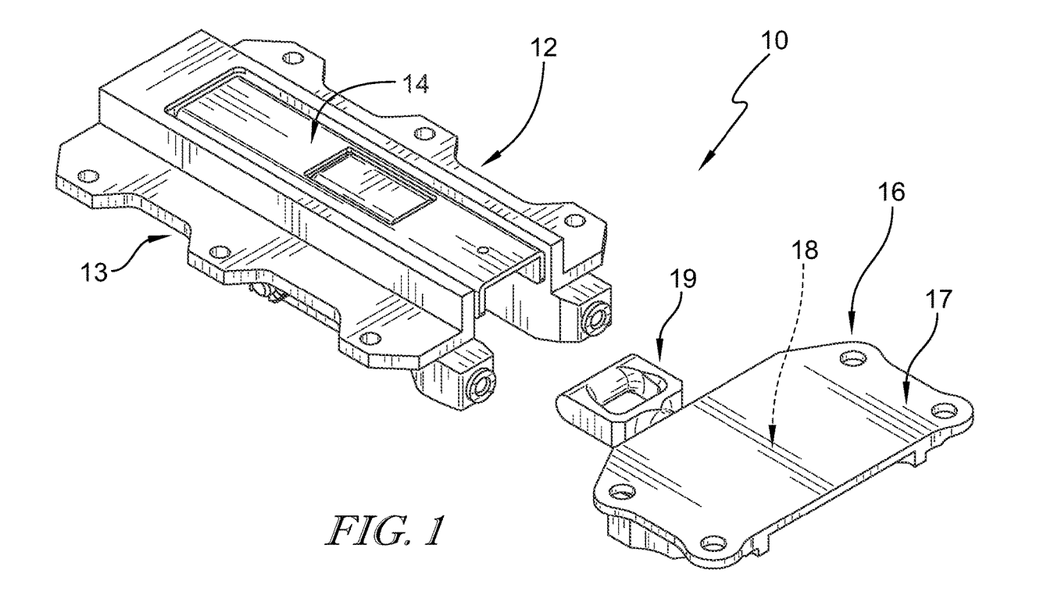
FIG. 1 is an upper perspective view of an exemplary embodiment of a latching system in accordance with the present disclosure showing that the latching system includes a latch assembly and a keeper assembly and suggesting that the latch assembly selectively engages with the keeper assembly as shown in FIG. 2.
Figure 2:
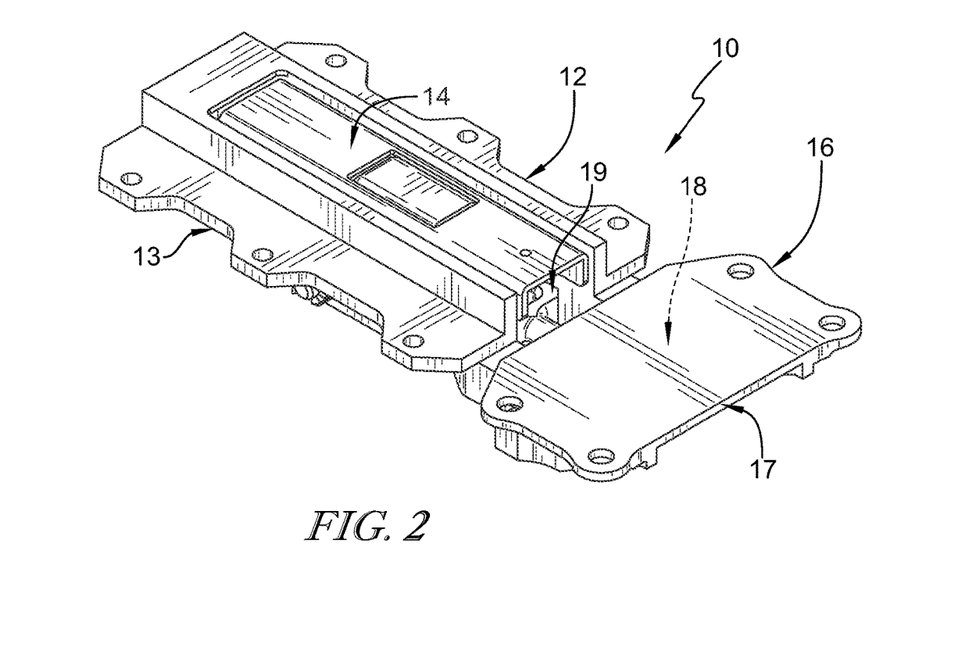
FIG. 2 is a view similar to FIG. 1 showing the latch assembly engaged with the keeper assembly to hold corresponding structures against movement relative to one another.
Figure 3:
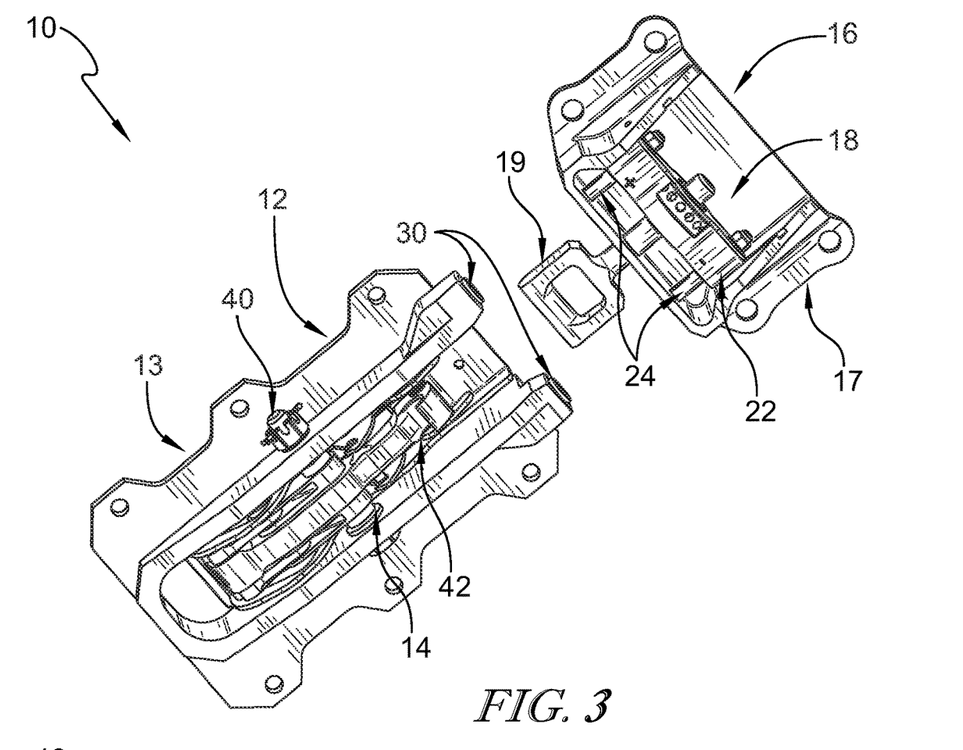
FIG. 3 is a lower perspective view of the latching system of FIG. 1 showing that the keeper assembly includes a base, a movable anti-shear mechanism coupled to the base, and a keeper coupled to the anti-shear mechanism and suggesting that the keeper and anti-shear mechanism are movable relative to the base with engagement by the latch assembly as shown in FIG. 4.
Figure 4:
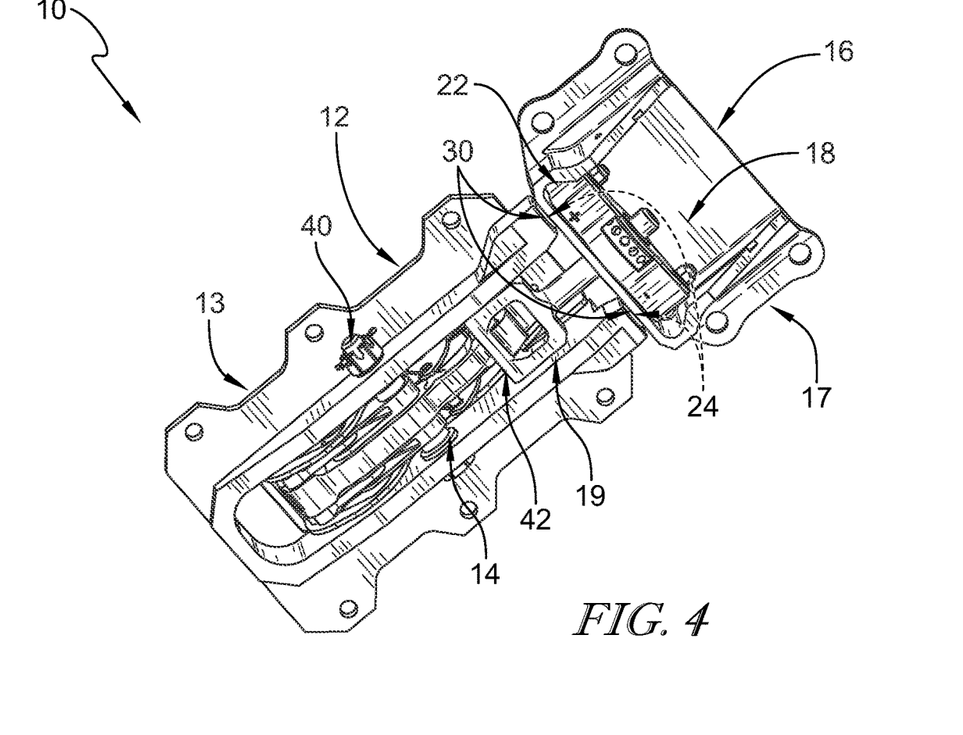
FIG. 4 is a view similar to FIG. 3 showing the latch assembly engaged with the keeper assembly and suggesting that a hook of the latch assembly engages with the keeper of the keeper assembly to draw the keeper assembly toward the latch assembly and move the anti-shear mechanism relative to the base to engage shear pins of the anti-shear mechanism with the latch assembly.
Figure 5:
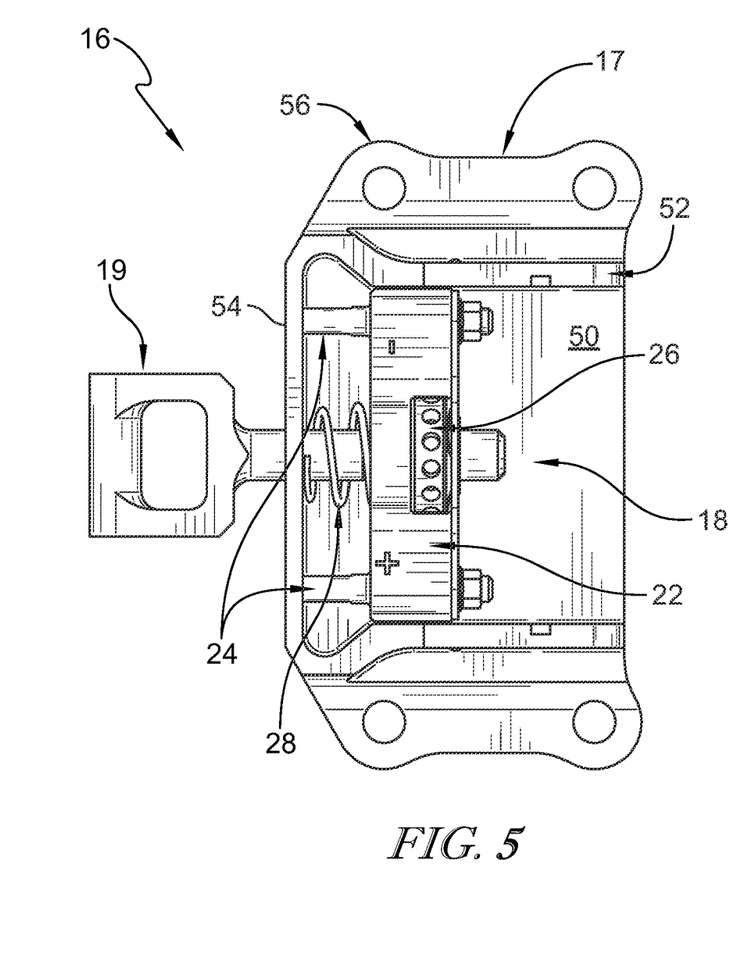
FIG. 5 is a bottom plan view of the keeper assembly of FIG. 3 showing the keeper and anti-shear mechanism in a retracted position relative to the base with the shear pins substantially received into the base relative to a face wall arranged toward the latch assembly.
Figure 6:
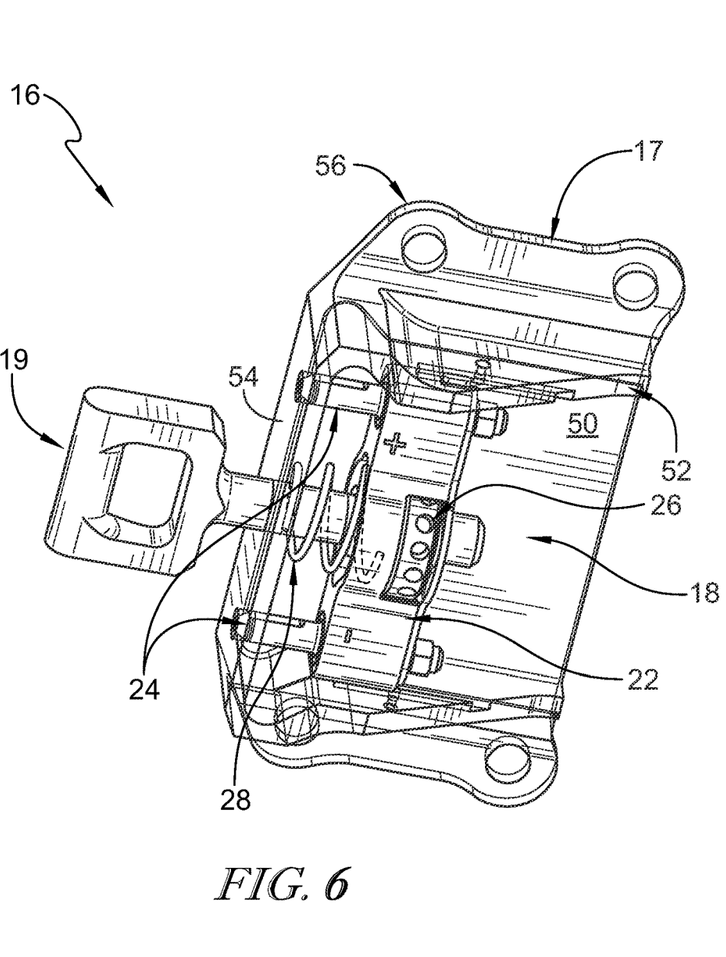
FIG. 6 is a lower perspective view of the keeper assembly of FIG. 5.
Figure 7:
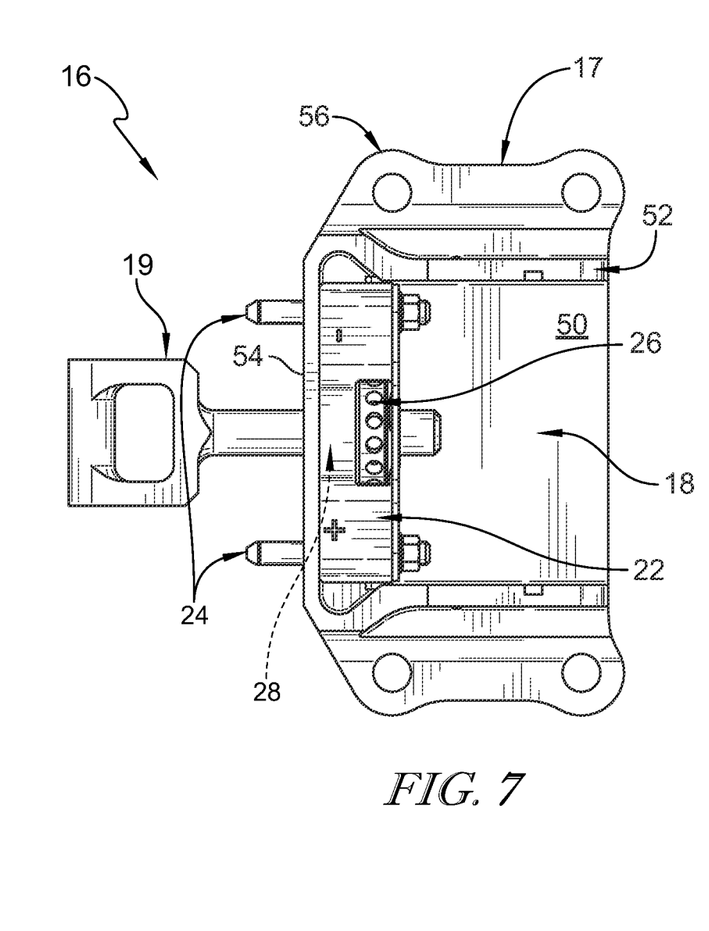
FIG. 7 is a bottom plan view of the keeper assembly of FIG. 4 showing the keeper and anti-shear mechanism in an extended position relative to the base with the shear pins extending outward from the face wall of the base toward the latch assembly for engagement therewith.
Figure 8:
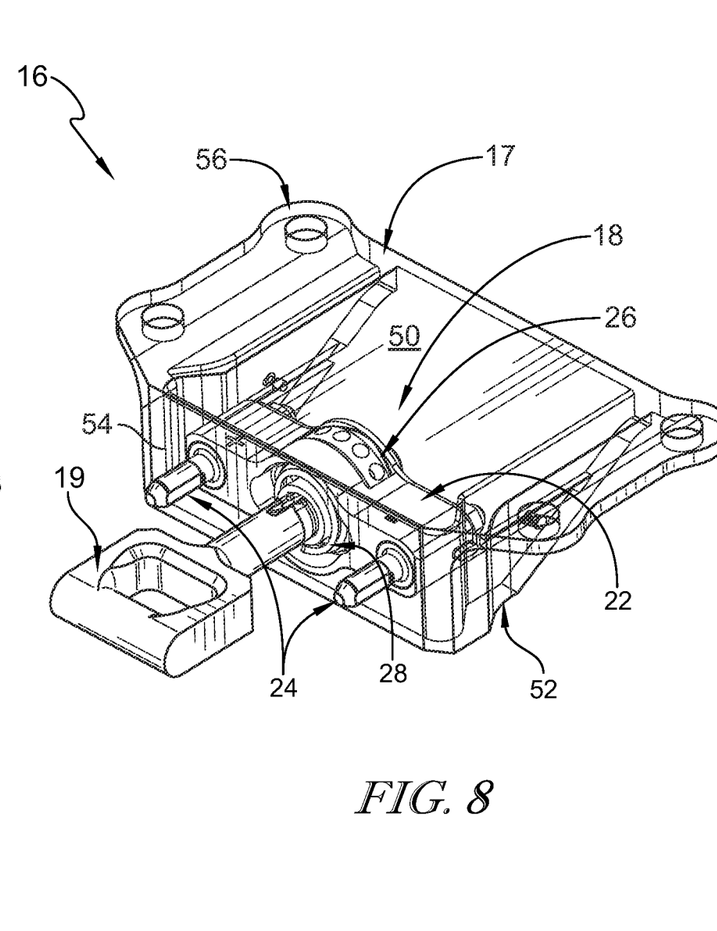
FIG. 8 is an upper perspective view of the keeper assembly of FIG. 7.

In the illustrative embodiment, the anti-shear mechanism 18 of the keeper assembly 16 includes a carrier 22 and shear pins 24 coupled to the carrier 22 for movement with the carrier 22 relative to the base 17 as shown in FIGS. 3-8. The anti-shear mechanism 18 is movable between a retracted position, shown in FIGS. 3, 5, and 6, and an extended position, shown in FIGS. 4, 7, and 8. In the retracted position, the shear pins 24 are substantially received into the base 17 relative to a face wall 54 of the base 17 arranged toward the latch assembly 12 as shown in FIGS. 3, 5, and 6. In the extended position, the shear pins 24 extending outward from the face wall 54 of the base 17 toward the latch assembly 12 for engagement with the frame 13, such as by extending into bushings 30 of the frame 13, as shown in FIGS. 4, 7, and 8. A hook 42 of the latch assembly 12 engages the keeper 19 of the keeper assembly 16 with movement of the latch assembly 12 toward the closed position to draw the keeper assembly 16 toward the latch assembly 12 and move the anti-shear mechanism 18 relative to the base 17 to engage the shear pins 24 with the frame 13. The shear pins 24 are configured to engage with the frame 13 to counteract shear loads across the latching system 10.

In some embodiments, the anti-shear mechanism 18 further includes an adjuster 26 as shown in FIGS. 5-8. The adjuster 26 engages with the keeper 19, such as with mutually engaged threads, to hold the keeper 19 on the carrier 22 and allow adjustment of the keeper 19 relative to the carrier 22. A biasing member 28, such as a coil spring, can engage with the base 17 and the carrier 22 to bias the anti-shear mechanism 18 toward the retracted position.

In the illustrative embodiment, the base 17 of the keeper assembly 16 includes a top wall 50, side walls 52 extending from the top wall 50, and the face wall 54 extending from the top wall 50 between the side walls 52 as shown in FIGS. 5-8. Mounting flanges 56 extend outward from the top wall 50 and allow attachment of the base 17 to a structure, such as the perimeter of an opening in an airframe of an aircraft. The carrier 22 of the anti-shear mechanism 18 extends between the side walls 52, and the shear pins 24 extend from the carrier 22 toward the face wall 54. The keeper 19 extends through the face wall 54 to engage with the carrier 22.

Figure 9:
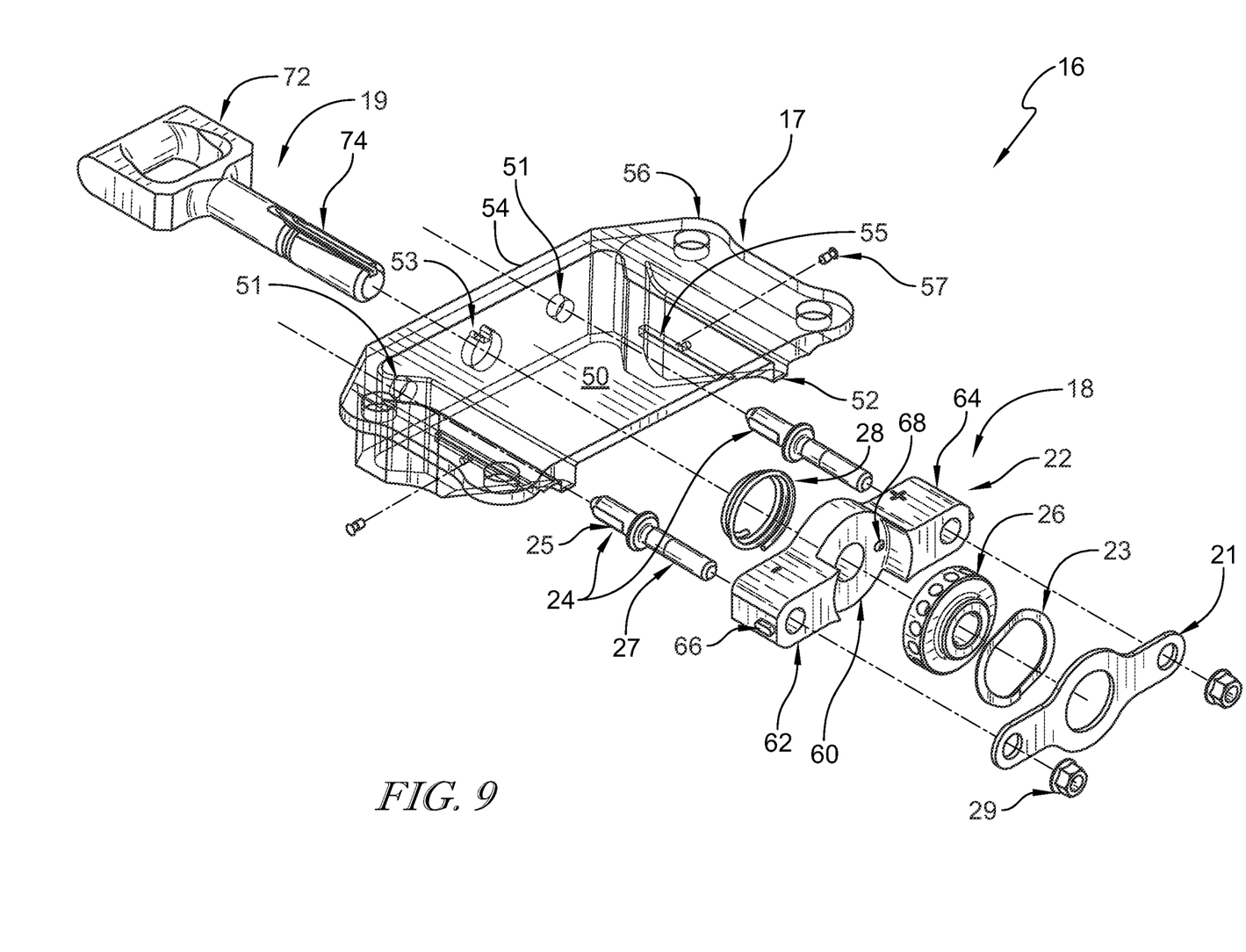
FIG. 9 is an upper perspective exploded assembly view of the keeper assembly of FIGS. 5-8 showing that the anti-shear mechanism includes a carrier and shear pins coupled to the carrier for movement with the carrier relative to the base.

The carrier 22 includes a center portion 60 and side portions 62, 64 extending from opposing sides of the center portion 60 as shown in FIG. 9. The adjuster 26 aligns with the center portion 60 of the carrier 22 and a cover plate 21 engages with the side portions 62, 64 to trap the adjuster 26 relative to the carrier 22. A biasing member 23, such as a wave spring, engages with the adjuster 26 and the cover plate 21 to bias the adjuster 26 toward the center portion 60. One or more detents 68 can be arranged on the center portion 60 to engage with the adjuster 26 and limit rotation of the adjuster 26 relative to the carrier 22. Tabs 66 extend outward from the side portions 62, 64 to engage with slots 55 formed into the side walls 52 of the base 17 for guiding movement of the carrier 22 relative to the base 17. Stop pins 57 extend into the slots 55 and are configured to engage with the tabs 66 to block removal of the carrier 22 from the base 17.

The shear pins 24 each illustratively include a head 25 and a shaft 27 as shown in FIG. 9. The heads 25 of the shear pins 24 extend into holes 51 formed though the face wall 54 of the base 17 and are configured to engage with the frame 13 with the anti-shear mechanism 18 in the extended position. The keeper 19 includes a clevis 72 and a shank 74. The shank 74 extends through a hole 53 formed through the face wall 54 of the base 17 to engage with the carrier 22 and/or adjuster 26. In the illustrative embodiment, the shank 74 and the hole 53 are formed to include mating anti-rotation features to align the keeper 19 with the base 17. The shafts 27 of the shear pins 24 extend into the side portions 62, 64 of the carrier 22 to hold the shear pins 24 on the carrier 22. In some embodiments, the shafts 27 are configured to extend through the side portions 62, 64 to engage with fasteners 29, such as nuts, to hold the shear pins 24 on the carrier 22. In some embodiments, the shafts 27 and fasteners 29 are formed to define mutually engageable threads. In some embodiments, the shafts 27 and fasteners 29 are configured to hold the cover plate 21 on the carrier 22. In some embodiments, the shafts 27 engage with the side portions 62, 64 to hold the shear pins 24 on the carrier 22 in addition or alternative to the fasteners 29. In some embodiments, the shear pins 24 are formed integrally with the carrier 22 such that the heads 25 extend from the side portions 62, 64 toward the holes 51.

Figure 10:
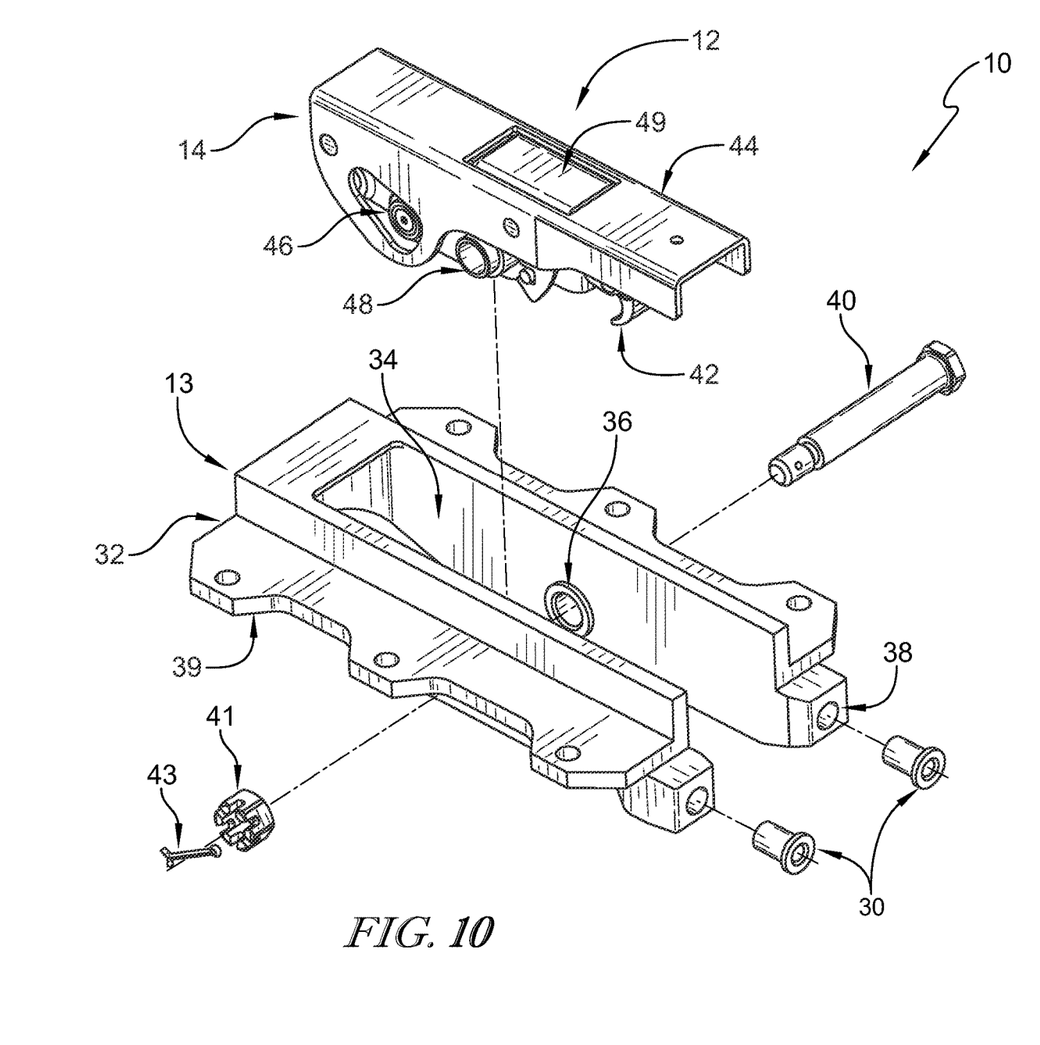
FIG. 10 is an upper perspective exploded assembly view of the latch assembly of FIGS. 1-4 showing that the latch assembly includes a latch mechanism coupled to a frame for movement relative to the frame between an opened position and a closed position.

The latch mechanism 14 of the latch assembly 12 includes the hook 42, a handle 44 coupled to the hook 42, and a connecting linkage 46 coupled to the hook 42 and the handle 44 as shown in FIG. 10. The latch mechanism 14 is mounted to the frame 13 with a fastener 40, such as a bolt, that extends through a sleeve 48 of the linkage 46. The handle 44 is rotatable relative to the hook 42 and cooperates with the linkage 46 to move the hook 42 relative to the fastener 40 with movement of the handle 44 between the opened and closed positions. A trigger 49 engages with the hook 42 in the closed position to hold the latch mechanism 14 in the closed position at the selection of a user. In some embodiments, a locking nut 41 and lock pin 43 block removal of the fastener 40 from the frame 13.

The frame 13 includes a body 32 defining a channel 34 arranged to receive the latch mechanism 14 as shown in FIG. 10. Mounting flanges 39 extend outward form the body 32 and allow attachment of the frame 13 to a structure, such as a panel of an aircraft. The fastener 40 extends through a hole 36 to mount the latch mechanism 14 on the frame 13. In the illustrative embodiment, bushings 30 extend into holes 38 in the frame 13 and are configured to engage with the heads 25 of the shear pins 24. In some embodiments, the heads 25 of the shear pins 24 engage with the holes 38 of the frame 13 without the use of the bushings 30. In some embodiments, the heads 25 of the shear pins 24 are flush or sub-flush relative to the face wall 54 of the base 17 with the anti-shear mechanism 18 in the retracted position.

Figure 11:
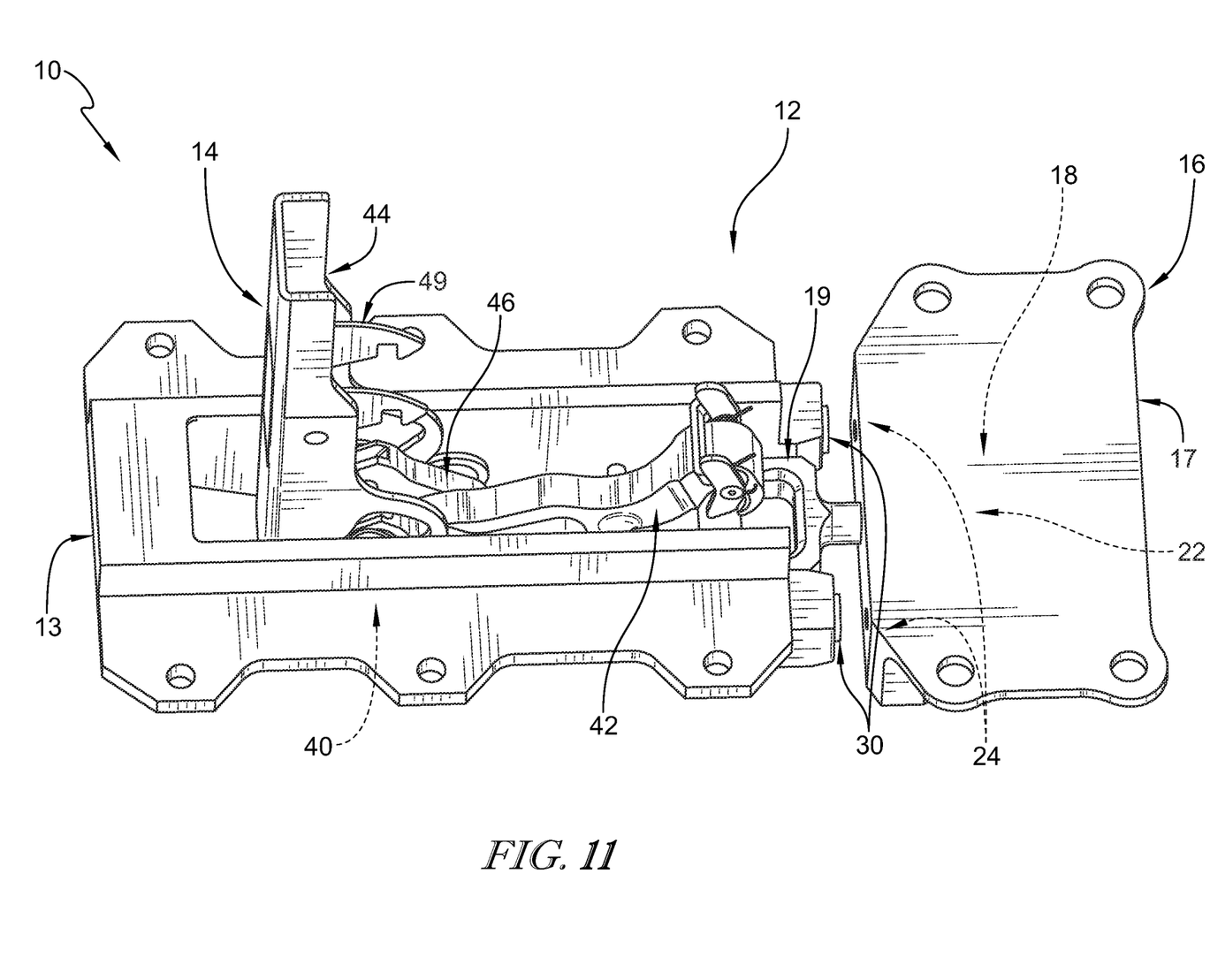
FIG. 11 is an upper perspective view of the latching system of FIG. 1 showing the latch mechanism of the latch assembly in the opened position and the keeper of the keeper assembly arranged for engagement by the latch mechanism.
Figure 12:
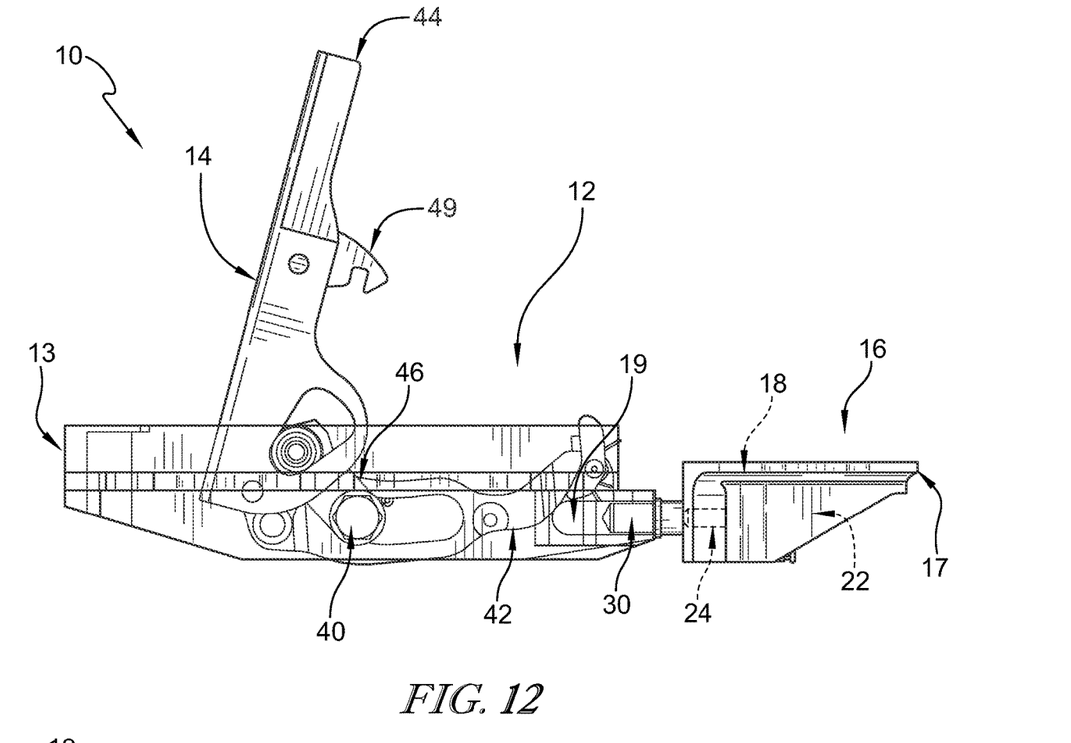
FIG. 12 is a side elevation view of the latching system of FIG. 11 showing a hook of the latch mechanism engaged with the keeper of the keeper assembly and suggesting that rotation of a handle of the latch mechanism toward the keeper assembly moves the hook relative to the frame to draw the keeper assembly toward the latch assembly.
Figure 13:
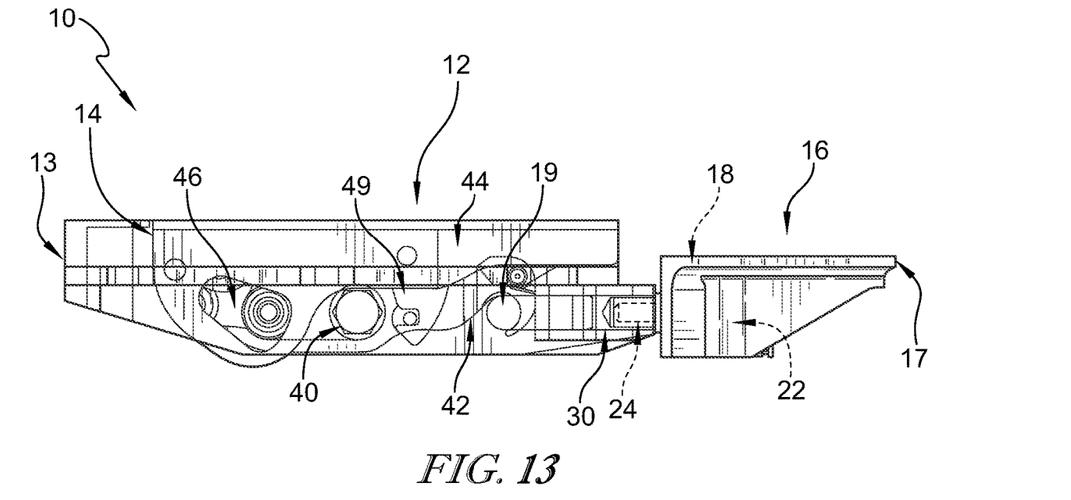
FIG. 13 is a view similar to FIG. 12 showing the latch mechanism in the closed position and the shear pins of the anti-shear mechanism extending into the frame for engagement with the frame to counteract shear loads across the latching system.
Figure 14:
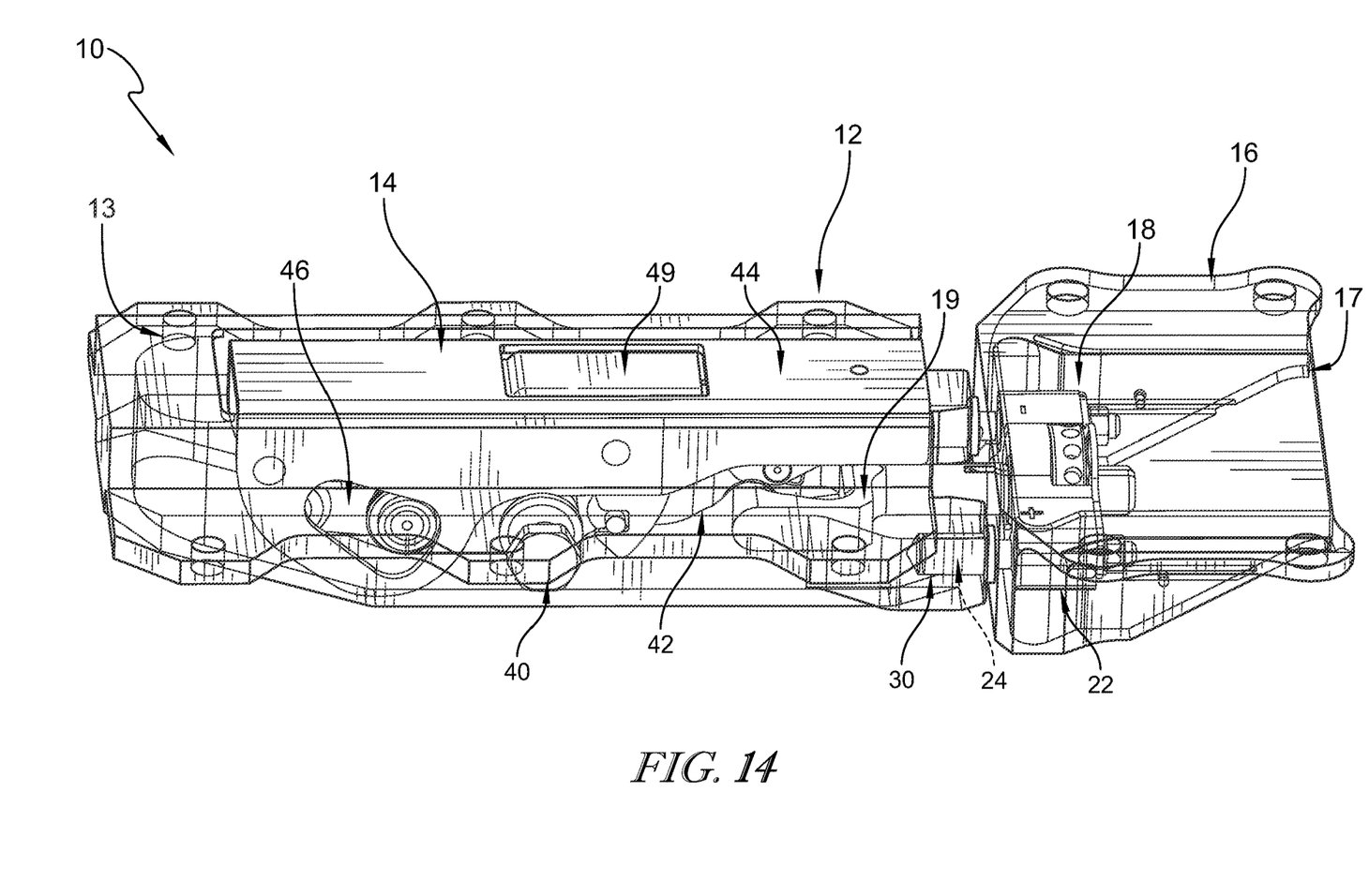
FIG. 14 is an upper perspective view of the latching system of FIG. 13.
Figure 15:
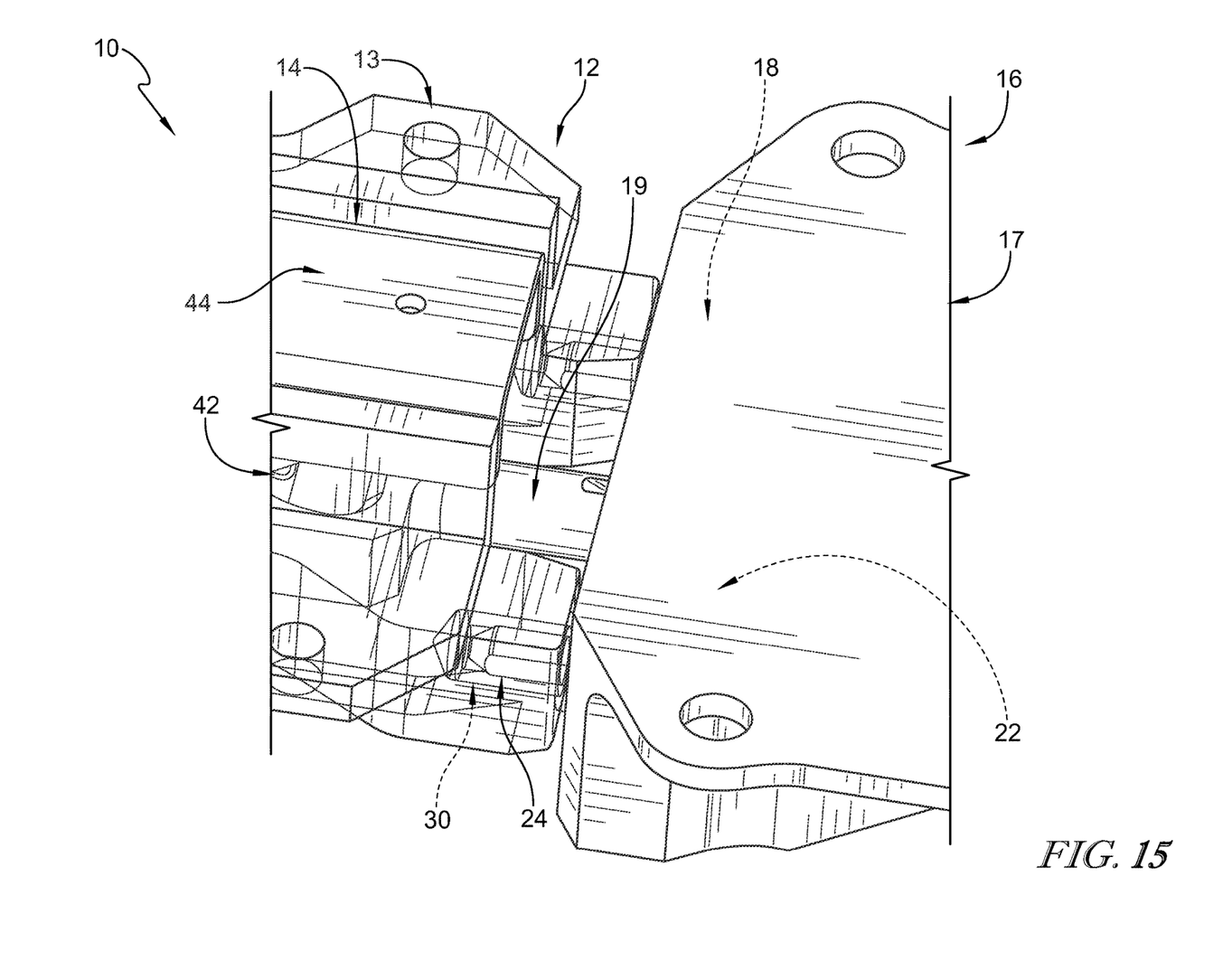
FIG. 15 is an enlarged view of the latching system of FIG. 14.

The latch assembly 12 and keeper assembly 16 are movable relative to one another with the latch mechanism 14 in the opened position, such as to allow an attached panel to move relative to an opening in an airframe of an aircraft, as shown in FIG. 11. Rotation of the handle 44 of the latch mechanism 14 toward the closed position engages the hook 42 with the keeper 19 to draw the keeper assembly 16 toward the latch assembly 12 as shown in FIGS. 11-13.

Further rotation of the handle 44 moves the anti-shear mechanism 18 relative to the base 17 against the bias of the biasing member 28 to engage the shear pins 24 with the frame 13 as shown in FIGS. 12-15. Tensile and shear loads across the latching system 10 are counteracted with the latch mechanism 14 in the closed position engaged with the keeper 19 and the shear pins 24 engaged with the frame 13.

In illustrative embodiments, the keeper assembly is configured to interface with a hook latch, and to provide an adjustable tension load by an adjusting nut. The keeper assembly translates along the load line as the hook latch is opened and closed. As it translates to the closed position, shear pins mounted on the keeper assembly interface with the latch housing (or frame) to provide shear load capability for the latching system. The shear load capability is provided in a plane perpendicular to the latch assembly load line.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

The invention claimed is:

1. A latching system comprising:
a latch assembly; and
a keeper assembly including a base, a movable anti-shear mechanism coupled to the base, and a keeper coupled to the anti-shear mechanism, the keeper and anti-shear mechanism being movable together relative to the base between a retracted position and an extended position, the keeper arranged to extend along a first axis,
wherein a hook of the latch assembly is configured to selectively engage with the keeper of the keeper assembly, the latch assembly is configured to selectively move the hook to draw the keeper assembly toward the latch assembly and move the anti-shear mechanism from the retracted position to the extended position to engage a first shear pin and a second shear pin of the anti-shear mechanism with the latch assembly, the first shear pin is arranged to extend along a second axis substantially parallel to and spaced apart from the first axis, and the second shear pin is arranged to extend along a third axis substantially parallel to and spaced apart from the first axis opposite the second axis.

2. The latching system of claim 1, wherein the base defines a face wall arranged toward the latch assembly, wherein the shear pin is substantially received into the base relative to the face wall with the anti-shear mechanism in the retracted position, and wherein the shear pin extends outward from the face wall toward the latch assembly with the anti-shear mechanism in the extended position.

3. The latching system of claim 1, wherein the anti-shear mechanism includes a carrier and the shear pin coupled to the carrier for movement with the carrier relative to the base, and wherein the keeper is coupled to the carrier for movement with the carrier relative to the base.

4. The latching system of claim 3, further comprising an adjuster coupled to the carrier, wherein the keeper is coupled to the adjuster, and wherein the adjuster is configured to selectively adjust a position of the keeper relative to the carrier.

5. The latching system of claim 3, further comprising a biasing member arranged between the carrier and the base, wherein the biasing member is configured to engage with the base and the carrier to bias the anti-shear mechanism toward the retracted position.

6. The latching system of claim 3, wherein the base is formed to define a slot, wherein a tab extends from the carrier, wherein the tab is arranged in the slot, and wherein a stop pin is coupled to the base and extends into the slot for engagement with the tab to limit movement of the anti-shear mechanism relative to the base.

7. The latching system of claim 1, wherein the latch assembly includes a latch mechanism coupled to a frame for movement relative to the frame between an opened position and a closed position, wherein the latch mechanism includes a handle coupled to the frame and the hook coupled to the handle for movement with the handle relative to the frame, and wherein the shear pin engages with the frame with the latch mechanism in the closed position and the anti-shear mechanism in the extended position.

8. The latching system of claim 7, further comprising a bushing coupled to the frame, wherein the shear pin engages with the bushing with the latch mechanism in the closed position and the anti-shear mechanism in the extended position.

9. The latching system of claim 1, wherein the latch assembly is coupled to a first structure, wherein the keeper assembly is coupled to a second structure, and wherein the latch assembly is selectively engageable with the keeper assembly to hold the first structure against movement relative to the second structure.

10. A keeper assembly comprising:
a base, the base defining a face wall;
a movable anti-shear mechanism coupled to the base, the anti-shear mechanism including a carrier, a first shear pin and a second shear pin coupled to the carrier for movement with the carrier relative to the base; and
a keeper extending through the face wall and coupled to the carrier, the keeper arranged to extend along a first axis,
wherein the keeper and anti-shear mechanism are movable together relative to the base between a retracted position and an extended position, the keeper extends outward from face wall and the first shear pin and second shear pin are substantially received into the base relative to the face wall with the anti-shear mechanism in the retracted position, the first shear pin and second shear pin extend outward from the face wall with the anti-shear mechanism in the extended position, the first shear pin is arranged to extend along a second axis substantially parallel to and spaced apart from the first axis, and the second shear pin is arranged to extend along a third axis substantially parallel to and spaced apart from the first axis opposite the second axis.

11. The keeper assembly of claim 10, further comprising an adjuster coupled to the carrier, wherein the keeper is coupled to the adjuster, and wherein the adjuster is configured to selectively adjust a position of the keeper relative to the carrier.

12. The keeper assembly of claim 10, further comprising a biasing member arranged between the carrier and the base, wherein the biasing member is configured to engage with the base and the carrier to bias the anti-shear mechanism toward the retracted position.

13. The keeper assembly of claim 10, wherein the base is formed to define a slot, wherein a tab extends from the carrier, wherein the tab is arranged in the slot, and wherein a stop pin is coupled to the base and extends into the slot for engagement with the tab to limit movement of the anti-shear mechanism relative to the base.

14. An anti-shear mechanism comprising:
    a carrier including a center portion and side portions extending from opposing sides of the center portion;
    an adjuster coupled to the center portion of the carrier;
    a first shear pin coupled to one of the side portions of the carrier, the shear pin extending outward from the carrier opposite the adjuster; and
    a second shear pin coupled to the other of one of the side portions of the carrier,
    wherein the adjuster is configured to engage with a keeper arranged to extend along a first axis and to selectively adjust a position of the keeper relative to the carrier, the first shear pin is arranged to extend along a second axis substantially parallel to and spaced apart from the first axis, and the second shear pin is arranged to extend along a third axis substantially parallel to and spaced apart from the first axis opposite the second axis.

15. The latching system of claim 2, wherein the keeper extends through the face wall, and wherein the keeper extends outward from face wall with the anti-shear mechanism in the retracted position.

\* \* \* \* \*